United States Patent
Alden et al.

(10) Patent No.: US 12,103,057 B2
(45) Date of Patent: Oct. 1, 2024

(54) ZERO-VALENT METAL SUSPENSION IN NON-AQUEOUS PHASE FOR WATER REMEDIATION

(71) Applicant: Tersus Environmental LLC, Wake Forest, NC (US)

(72) Inventors: David F. Alden, Scranton, PA (US); Gary M. Birk, Wake Forest, NC (US)

(73) Assignee: Tersus Environmental LLC

( * ) Notice: Subject to any disclaimer, the term of this patent is extended or adjusted under 35 U.S.C. 154(b) by 0 days.

(21) Appl. No.: 17/885,171

(22) Filed: Aug. 10, 2022

(65) Prior Publication Data
US 2022/0388047 A1    Dec. 8, 2022

Related U.S. Application Data (62) Division of application No. 16/278,328, filed on Feb. 18, 2019, now Pat. No. 11,491,522.

(51) Int. Cl.
| | |
|---|---|
| B09C 1/02 | (2006.01) |
| B01J 20/02 | (2006.01) |
| B09C 1/00 | (2006.01) |
| C02F 1/44 | (2023.01) |
| C02F 1/70 | (2023.01) |
| C02F 101/20 | (2006.01) |
| C02F 103/06 | (2006.01) |

(52) U.S. Cl.
CPC .......... *B09C 1/025* (2013.01); *B01J 20/0229* (2013.01); *B09C 1/002* (2013.01); *C02F 1/44* (2013.01); *C02F 1/705* (2013.01); *B09C 2101/00* (2013.01); *C02F 2101/20* (2013.01); *C02F 2103/06* (2013.01); *C02F 2305/04* (2013.01)

(58) Field of Classification Search
CPC ...................................... B09C 1/002
See application file for complete search history.

(56) References Cited

U.S. PATENT DOCUMENTS

| | | |
|---|---|---|
| 6,664,298 B1 | 12/2003 | Reinhart et al. |
| 6,906,235 B2 | 6/2005 | Funakoshi |
| 7,037,946 B1 | 5/2006 | Reinhart et al. |
| 7,128,841 B2 | 10/2006 | Zhang |
| 7,611,637 B2 | 11/2009 | Zhang et al. |
| 9,352,987 B2 | 5/2016 | Noland |
| 2001/0042723 A1 | 11/2001 | Sivavec |
| 2004/0007524 A1 | 1/2004 | Noland |
| 2005/0006306 A1 | 1/2005 | Noland |
| 2007/0225542 A1 | 9/2007 | Higgins |
| 2008/0272051 A1 | 11/2008 | Baseeth |
| 2016/0289106 A1 | 10/2016 | Freim, III |
| 2018/0099877 A1 | 4/2018 | Chang |
| 2020/0031695 A1 | 1/2020 | Bhattacharjee |
| 2020/0038926 A1 | 2/2020 | Freim, III |

(Continued)

OTHER PUBLICATIONS

Gu et al., "Mechanochemically Sulfidated Microscale Zero Valent Iron: Pathways, Kinetics, Mechanism, and Efficiency of Trichloroethylene Dechlorination," Environ. Sci. Technol. 51:12653-12662, 2017.

(Continued)

*Primary Examiner* — Peter F Godenschwager
(74) *Attorney, Agent, or Firm* — BELLES KATZ LLC (57) ABSTRACT

The present subject matter illustrates a zero-valent metal suspension in non-aqueous phase. The suspension comprises 41 wt. % of a plurality of zero-valent iron particles; 0.1 wt % of a surfactant; 36 wt. % of an oil; and 23 wt. % of a thickening agent.

17 Claims, 6 Drawing Sheets

(56) References Cited

U.S. PATENT DOCUMENTS

2020/0261953 A1    8/2020    Bang
2020/0261954 A1    8/2020    Alden

OTHER PUBLICATIONS

Lan, "Characterization of the Iron Sulfide Oxidation Products Formed During Reductive Dechlorination of Chlorinated Aliphatic Contaminants," University of Oklahoma, Dissertation, 2016.

Lan, "Controlled Sulfidation to Optimize the Remediation Performance of Zerovalent Iron and Related Materials," Tersus 2018 Webinar Series, Jun. 21, 2018.

Su et al., "Chapter 9: Sulfide-Modified NZVI (S-NZVI): Synthesis, Characterization, and Reactivity," Nanoscale Zerovalent Iron Particles for Environmental Restoration, Springer International Publishing AG, 2019, pp. 359-386.

Yang, Z., Xu, H., Shan, C., Jiang, Z., Pan, B., Effects of brining on the corrosion of ZVI and its subsequent As(III/V) and Se(IV/VI) removal from water, Chemosphere (2017), doi: 10.1016/j.chemosphere.2016.12.029.

ZERO-VALENT METAL SUSPENSION IN NON-AQUEOUS PHASE FOR WATER REMEDIATION

CROSS-REFERENCE TO RELATED APPLICATIONS

The present application is a divisional application of U.S. application Ser. No. 16/278,328 "Zero-valent metal suspension in non-aqueous phase for water remediation", filed Feb. 18, 2019, the disclosure of which is hereby incorporated by reference.

TECHNICAL FIELD

This present subject matter relates to remediation of groundwater which may be toxic to living-beings and environment, and/or wastewater discharged from industrial and commercial-facilities. In particular, the present subject-matter relates to zero-valent iron (ZVI) particles acting as the core-mechanism for remediation.

BACKGROUND

Commonly known methods for cleaning contaminated groundwater is to build in-situ barriers or curtains with reactive or adsorptive-materials. Contaminants are removed when the contaminated-water passes through the reactive or adsorptive materials through various physical, chemical and/or biological mechanisms. Such treatment curtains are often called "permeable reactive barriers" (PRBs) as they are usually more water permeable than the native soil/sediment materials. The barriers are semi-permanent or replaceable units that are installed across the flow path of groundwater.

An advantage of the above method is that the contaminated water can be treated in situ without the need for it to be pumped out for external treatment and disposal. However, a disadvantage of the method is the high cost of building the in-situ curtain because of the large amount of soil and sediments that must be dug out and disposed of to accommodate the reactive or adsorptive materials. The cost is especially high for deep aquifers. (Wei-xian Zhang et al, 2006)[1]

[1] U.S. Pat. No. 7,611,637B2

Another technique for treating contaminated groundwater in its native place (in situ) involves directly introducing iron powders to the contaminated media (i.e., aquifer, soils, wastewater, sludge, etc.) Aquifer remediation typically uses injection techniques to distribute the ZVI in the contaminated groundwater region. Small iron particles (i.e., iron powders) typically sink slowly when submerged in a liquid such as water and could remain in suspension for extended-periods of time. ZVI slurries or suspensions can thus be made by mixing the ZVI particles with carrier fluids such as water, and can be pumped or percolated directly into the aquifer. This method has been shown to be effective for cleaning contaminated groundwater.

Iron and Iron compounds are used for the purification of water impacted by various contaminants because it can react with a wide-variety of naturally-occurring and man-made contaminants. For example, iron is effective in groundwater remediation as it enables the transformation of pervasive toxic organic solvents such as carbon tetrachloride ($CCl_4$), chloroform ($CHCl_3$), trichloroethene or TCE ($C_2HCl_3$), and tetrachloroethene ($C_2Cl_4$) into non-toxic byproducts. For example, trichloroethene can be reduced to ethane and chloride according to the following reaction:

$$C_2HCl_3 + 4FeO^0 + 5H^+ \rightarrow C_2H_6 + 4Fe^{2+} + 3Cl^-$$

Figure 1:
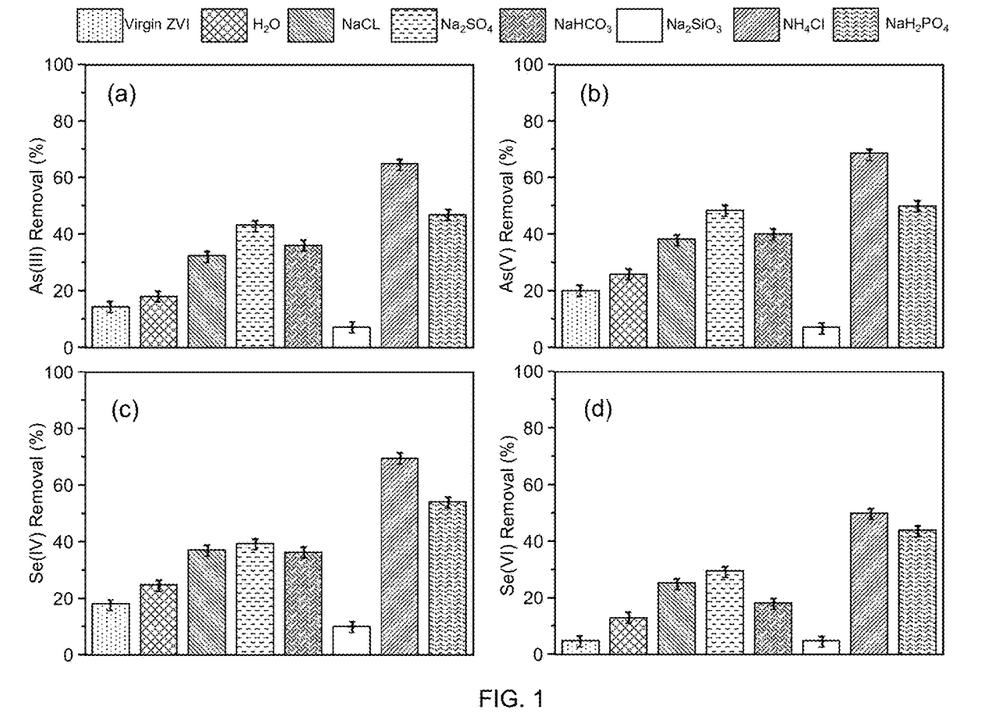
FIG. 1 plots removal of certain contaminants in various brine waters using various iron-based amendments.

The usage of ZVI for in situ groundwater remediation refers to the action of the ZVI as a reductant that generates materials in the subsurface for the purpose of degrading toxic organic compounds to potentially nontoxic compounds. As ZVI is applied in groundwater remediation, it undergoes brining with various solutions such as NaCl, $Na_2SO_4$, $NaHCO_3$, $Na_2SiO_3$, $NH_4Cl$, and $NaH_2PO_4$ for the purposes of removal of As(III/V) and Se(IV/VI) from the contaminated groundwater. FIG. 1 (a to d) indicates a percentage removal of As(III/V) and Se(IV/VI) from groundwater sample based on aforesaid brine and ZVI particle solutions as well as the use of virgin ZVI.

However, as may be observed from scanning electron microscope (SEM) images provided in FIG. 2, except for $Na_2SiO_3$, the brine solutions enhance ZVI corrosion, in the following hierarchy from highest corrosion enhancement to lowest:

$$NH_4Cl > NaH_2PO_4 > Na_2SO_4 > NaCl > NaHCO_3 > H2O > Na_2SiO_3.$$

Figure 2:
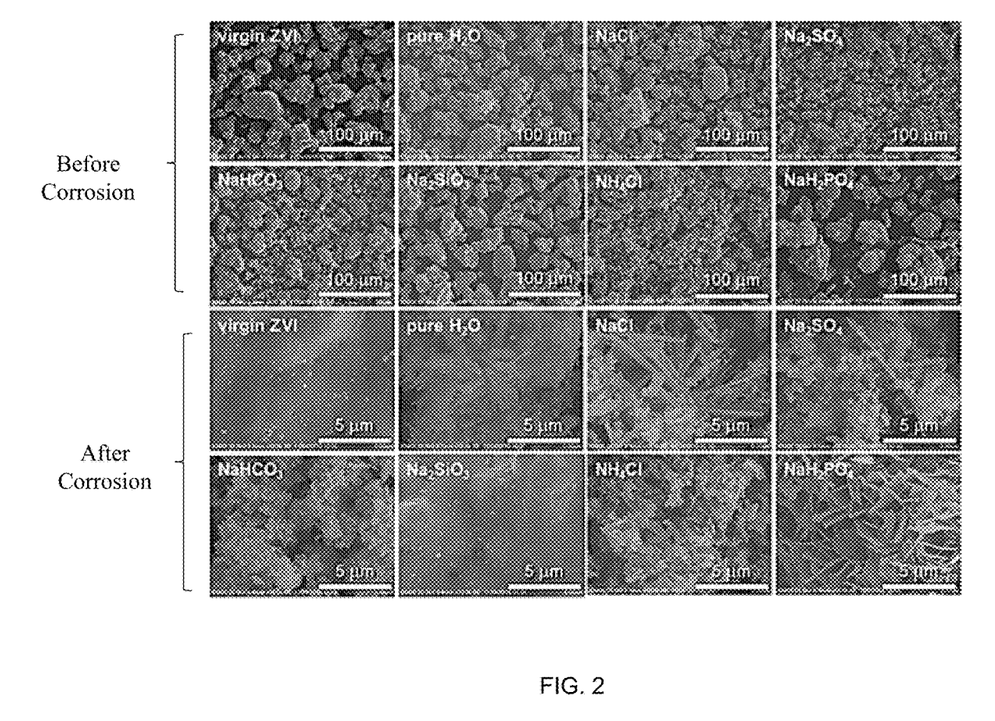
FIG. 2 consists of various Scanning electron microscope (SEM) images of ZVI before and after exposure to brine solutions to illustrate its corrosion.

More specifically, FIG. 2 identifies corrosion products derived from ZVI through scanning electron microscopy (SEM) and x-ray powder diffraction (XRD) images, and the dominant corrosion products vary with the type of brine solution. Accordingly, FIG. 2 illustrates a positive correlation between the degree of ZVI corrosion and As(III/V)/Se (IV/VI) removal by the ZVI. The chemical reactions illustrating the corrosion process of ZVI particles in FIG. 2 are as follows:

$$4Fe_3O_4 + O_2 + 18H_2O \rightarrow 12Fe(OH)_3$$

$$4Fe_3O_4 + O_2 + 6H_2O \rightarrow 12\gamma\text{-FeOOH}$$

Corrosion on ZVI not only changes the color, but also changes the surface properties of ZVI particles. Thus, a removal-performance of the ZVI decreases during the remediation process. Accordingly, there lies at least a need to improve the ZVI product quality due to corrosion issues in aqueous-phase.

During the usage of ZVI for in situ groundwater remediation, a blocking-effect of the ZVI in soils is known to occur. When the ZVI particles start depositing on the surface of the soil-particles, other ZVI particles in suspension are attracted to cause agglomeration. Similar problem of ZVI particle-deposition is observed in case saturated-porous media such as aquifers. Such an agglomeration eventually causes a "clogging" of the soil-pores or aquifers, thereby blocking the passage of incoming flow of slurries carrying the ZVI particles. Thus, the clogging of soil pores or aquifers is a major limitation to the use of ZVI based remediation, as it prevents the ZVI particles from reaching the deeper layers. Moreover, the ZVI particles are denser than water, which naturally causes them to settle in a fluid-medium and contribute to occurrence of such clogging effect. Accordingly, there lies at least a need of a stable dispersion of the ZVI particles in the groundwater to avoid typical issues with ZVI particle's low mobility in saturated-porous media such as aquifers and soils, that undesirably leads to sedimentation and deposition of the ZVI particles.

In case the viscosity of the ZVI-carrying fluid to address stability issues (i.e., capability of suspending the ZVI particles in the groundwater), viscosity complicates the slurry's injectivity required for groundwater in situ remediation.

SUMMARY

This summary introduces a selection of concepts that are further described in the Detailed Description of Some Embodiments section of the present disclosure. This summary is neither intended to identify key or essential inventive concepts of the disclosure, nor is it intended for determining the scope of the invention or disclosure.

The present subject matter illustrates an improved ZVI composition and a method of preparation thereof, such that the ZVI particles are dispersed in a non-aqueous media comprising propylene glycol and/or soybean oil. The present composition renders a stable dispersion during employment of ZVI for in situ groundwater remediation, thereby augumenting ZVI particle's mobility in the saturated porous media and substantially minimizing the clogging of the soil pores and aquifers. Further, the present composition substantially minimizes the corrosion of ZVI particles during the groundwater remediation process.

To further clarify advantages and features of the invention claimed herein, example descriptions and embodiments are rendered by reference to specific embodiments thereof, which is illustrated in the appended drawings. It is appreciated that these drawings depict only example embodiments of the invention and are therefore not to be considered limiting of its scope. The disclosure will be described and explained with additional specificity and detail with the accompanying drawings.

BRIEF DESCRIPTION OF THE DRAWINGS

The above and other features, aspects, and advantages of the present disclosure will become better understood when the following detailed description is read with reference to the accompanying drawings in which like characters represent like parts throughout the drawings, wherein.

The elements in the drawings are illustrated for simplicity and may not have been necessarily drawn to scale. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION OF SOME EXAMPLE EMBODIMENTS

For the purpose of promoting an understanding of the principles of the present disclosure, reference will now be made to the embodiment illustrated in the drawings and specific language will be used to describe the same. It will nevertheless be understood that no limitation of the scope of the present disclosure is thereby intended, such alterations and further modifications in the illustrated system, and such further applications of the principles of the present disclosure as illustrated therein being contemplated as would normally occur to one skilled in the art to which the present disclosure relates.

The foregoing general description and the following detailed description are explanatory of the present disclosure and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this present disclosure belongs. The system, methods, and examples provided herein are illustrative only and not intended to be limiting.

Two major current and industrially available technologies for the removal of selenium from water are biological treatments and zero-valent iron (ZVI) technology. Biological treatment requires a large footprint and it cannot remove the reduced form of selenium, selenocyanate. During ex-situ remediation, Selenocyanate is first oxidized to selenite and selenate before it may be removed by a biological treatment. However, during in-situ remediation of toxic forms of Selenium, the Selenocyanate's state may be changed to a non-toxic, stable, non-soluble state instead of removal.

More specifically, ZVI technology can remove selenium in different oxidation states through redox reactions, adsorption, and co-precipitation in a reactor. On the contrary, in aquifer-treatment, the removal of selenium is not intended and merely the state is changed to a non-toxic, stable, non-soluble state. Yet, surface-corrosion of ZVI can form oxide and oxyhydroxide compounds that passivate the ZVI surfaces, diminishing ZVI reactivity with respect to the target contaminants, and eventually causing the reactions to stop altogether. The lack of a viable method to overcome the ZVI surface passivation adversely impacts the development of ZVI technology into a reliable selenium removal solution.

Embodiments of the present disclosure will now be described below in detail with reference to the accompanying drawings.

The present subject matter at least illustrates a zero-valent metal suspension in non-aqueous phase. More specifically, a composition for a zero-valent metal suspension in non-aqueous phase is disclosed. The composition comprises a) a particulate zero-valent metal; b) a surfactant; c) a vegetable oil; and d) a thickening agent. The zero-valent metal particles are a plurality of microscale zero-valent metal particles, preferably an iron based powder. Said plurality of microscale zero-valent iron particles are 1-45 microns in diameter, preferably an average particle size (D50) of 10 microns or less.

In an embodiment, the microscale zero-valent iron (ZVI) particle comprises an acid-washed iron-based powder. The apparent density of the acid-washed iron-based powder is 0.5 to 5 g/cm$^3$, preferably 1 to 2 g/cm$^3$. The iron-based powder has Fe-content of at least 90% by weight and is a hydrogen-reduced iron powder. Such iron-based powder BET (Brunauer, Emmett and Teller) has a surface area being least 1.6 m$^2$/g. 9. The iron-based powder is present in an amount ranging from 0.05 to 45.0% by weight. In an implementation, the ZVI (powered metal) may be obtained from sponge iron or atomized iron, which are in turn obtained from treatment, reduction, regrinding etc of iron ore. In other implementation, the ZVI (powdered metal) may be obtained from waste material like steel mill waste (Kesavan and Azad, 2008). Steel industry waste like dust from Blast Furnace (Shen et al., 2013) and pickling waste liquor (Fang et al., 2011) has been known to be used for preparation of powdered ZVI. The sludge produced in the steel industry, from the Basic Oxygen Furnace (BOF), has high percentage of iron and may be chosen as the starting material for the production of powdered ZVI.

Further, in an embodiment, the surfactant is Aerosol OT and present in the amount ranging from 0.05 to 1.0% by weight. Other examples of surfactants include Fatty acid sulfonates (the most common of which is sodium laryl sulfate, or SLS), Ethoxylated compounds, such as ethoxylated propylene glycol, Lecithin, Polygluconates, Quaternary ammonium fatty acid adducts (aka ammonium quats, used as fabric softeners), Lignin sulfonates, etc.

Further, in an embodiment, the vegetable oil is a C4-C22 oil selected from the group consisting of soybean oil, corn oil, coconut oil, canola oil, peanut oil, sunflower oil, olive oil, garlic oil, crambe oil, and mixtures thereof. The oil is present in the amount ranging from 33 to 63% by weight.

Further, in an embodiment, the thickening agent is propylene glycol and present in the amount ranging from 21 to 41% by weight.

In alternative implementation of the present subject matter, the zero-valent metal suspension is a zero-valent iron (ZVI) based suspension, interchangeably referred as ZVI suspension or ZVI formulation). The suspension comprises about 41 wt. % of a of zero-valent iron particles. In an example and without limiting the scope of present subject matter, the zero-valent iron may be a uniquely engineered media that has extremely high-porosity, surface area and reactivity, providing exceptional performance. In an example, the size of present ZVI particles is about 1-18 micron (diameter) for propagation into the majority of porous media. The present ZVI has much higher reactivity and a surface-area than a conventional carbonyl-iron, less-dose is required and the degradation rate of TCE is much faster. The ZVI suspension can at-least reduce remediation time and provide better longevity for increased-reliability and reduction of injection.

The ZVI suspension further comprises about 36 by wt % of soybean oil. The 36% by weight of Soybean oil in the suspension is selected as a long-lasting source of carbon and hydrogen required for enhanced reductive de-chlorination and other bioremediation processes. It also serves as a fermentable substrate to create favourable aquifer conditions for anaerobic remediation and provide electrons for extended time. In an example, the soybean oil is refined, bleached, and deodorized (RBD) soybean oil.

The composition further comprises about 23% of propylene-glycol (PG) as an oil thickening agent. In example, the PG may be color-less and able to depress the freezing point of water when mixed with groundwater. PG is also non-corrosive, has very low volatility and very low toxicity. PG is used as a thickener because it serves as a cross-linker between soybean molecules and ZVI particles, giving the latter a positive buoyancy effect. The composition further comprises about 0.1% surfactant, wherein said surfactant is dioctyl sodium sulfosuccinate (AOT).

Overall, the ZVI suspension is a reactive-system comprising a food-grade vegetable oil, an oil-thickening agent, and a surfactant that suspend reactive ZVI or other metal particles. Such suspension comprises a liquid membrane formed of the food-grade vegetable oil encapsulating the ZVI particles as a part of the suspension-network.

In an embodiment, the present matter further illustrates a method for preparing suspension of zero-valent iron particles in non-aqueous media. The method comprises:
a) preparing a non-aqueous solution by mixing an oil-thickener of about 21 to 41% by weight into a vegetable oil of about 33 to 63% by weight.
b) Thereafter, a surfactant of about 0.05 to 1.0% by weight is dissolved into the solution.
c) Finally, a suspension of ZVI particles into a non-aqueous phase is prepared by mixing about 0.05 to 45.0% by weight of the ZVI particles into the non-aqueous solution.

Figure 3:
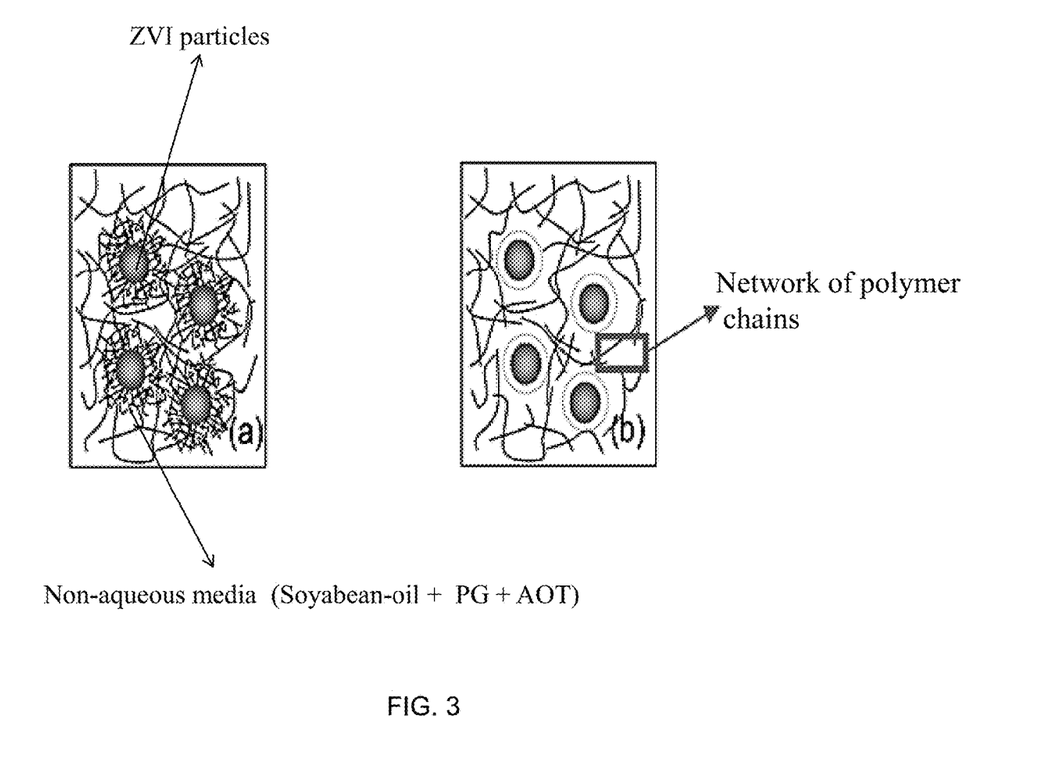
FIG. 3 is a graphical representation illustrating the difference between Steric stabilization and dispersion in a liquid gel and thereby representing at least two types of example suspension networks in the ZVI formulation, in accordance with an embodiment of the present disclosure.

FIG. 3 (a and b) illustrates a suspension network comprising the combination of soybean oil, PG and AOT as the continuous phase or oil phase. The ZVI particles constitute the dispersant phase. The suspension into oil phase at least leads to an increased steric repulsion between ZVI particles, while ensuring least increase in viscosity. The surfactant and oil thickener within the suspension lead to increase in positive-buoyancy.

Overall, the ZVI suspension illustrated by the present subject matter includes long lasting electron donors (soybean oil) and quick release electron donors (PG). The in situ chemical reduction (ISCR) is carried out. The present ZVI is advantageously used for ISCR. ISCR is a remediation technique that combines both biological processes and ZVI particle-driven abiotic pathways to chemically reduce persistent organic compounds such as chlorinated solvents, pesticides and energetics into harmless end products. The incorporation of ZVI enhances chlorinated contaminant remediation by enabling various chemical reduction pathways. In order to accomplish rapid and sustained degradation of chlorinated hydrocarbons and other toxic groundwater contaminants, the aforesaid suspension of ZVI in the non-aqueous system with propylene glycol and soybean oil has been developed with the unique combination of small particles, ease of use, electron donors, and corrosion protected product until emplacement into the groundwater.

In an example, the present ZVI suspension is suitable for the dechlorination of trichoroethene (TCE), which can be in the form of a dense non-aqueous phase liquid (DNAPL). DNAPLs in the subsurface can act as a source of groundwater contamination. TCE and other contaminants in the form of DNAPL may likewise be remediated using the present suspension. In operation, DNAPL can diffuse into the oil phase of the ZVI suspension, whereupon it reaches the surface of the zero-valent metal particles and activates a dehalogenation process. A hydrocarbon reaction by-product of the dehalogenation reaction, for example ethene, diffuses out of the suspension and vents to the aquifer.

DNAPL and contaminants in other phases in the subsurface may become exposed to the ZVI suspension in a variety of ways. Firstly, the likely location of the DNAPL is defined, as illustrated through the example provided under FIG. 4. In one embodiment, the zero-valent metal emulsion is delivered in-situ to contamination pools via a system of at least one injection well as illustrated by example implementations provided in FIG. 5. Injection wells can be permanent structures left in the ground for repeatedly injecting the ZVI suspension into the ground. The injection wells may contain screen portions through which the ZVI suspension may pass in order to flow into the subsurface and stay in the vicinity or contact the DNAPL phase. Alternatively, ZVI suspension may be injected into the DNAPL-impacted aquifer by jetting the fluid through hollow rods that are hammered into the ground using commonly called "direct push" technology. Direct Push machines "push" tools and sensors into the ground without the use of drilling to remove soil to make a path for the tool. A distal portion of the push rods has a series of holes along its length from where the ZVI suspension flows as it is jetted into the native matrix or subsurface aquifer material. The push rods are advanced further into the soil to cover the vertical extent and depth of the contamination. When the injection of the ZVI Suspension is complete, the push rods are removed from the ground.

Figures 4, 4A:
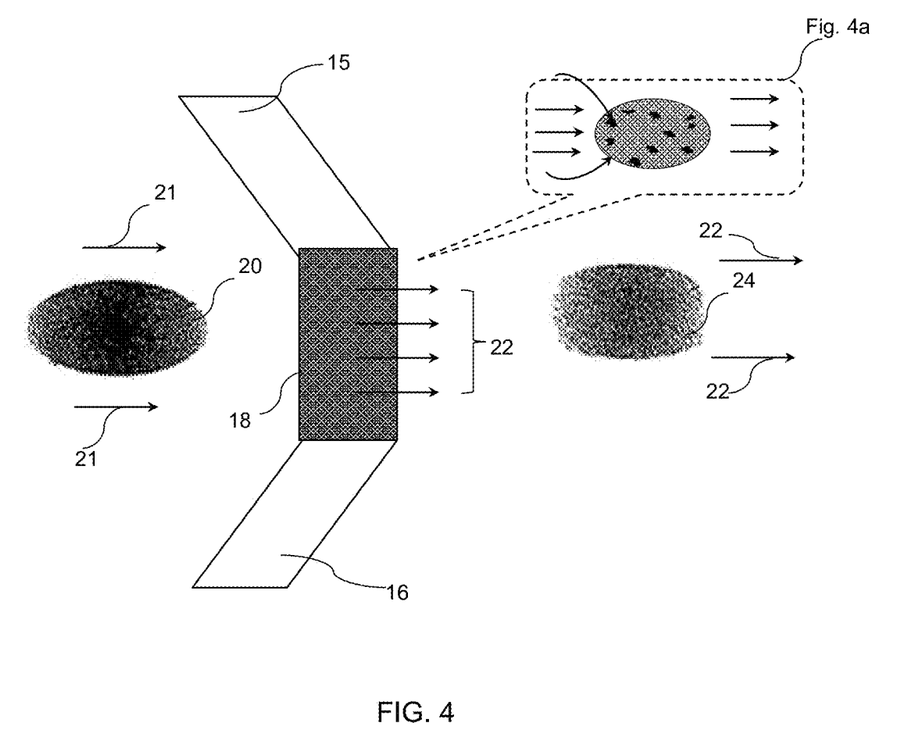
FIG. 4 is a schematic representation of a method for treating groundwater using a permeable reactive barrier and thereby representing example application for the present ZVI formulation during groundwater remediation, in accordance with an embodiment of the present disclosure.
Figure 6:
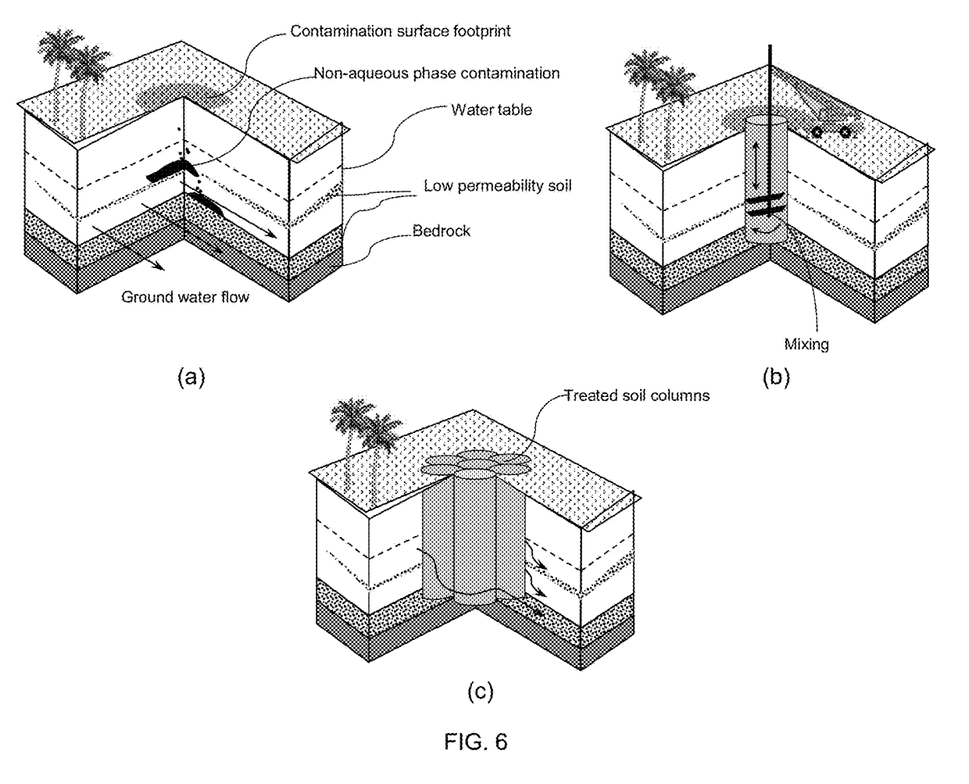
FIG. 6 is a schematic representation of a method for soil treatment according to the present ZVI formulation when introduced below the earth's surface, thereby illustrating another example application of ZVI formulation during in situ soil remediation, in accordance with an embodiment of the present disclosure.

As illustrated in FIG. 6, the ZVI Suspension can be directly mixed with contaminated soils. It can also be used to create a permeable reactive barrier (e.g. as depicted in FIG. 4) by filling a trench with ZVI suspension or by injecting sufficient ZVI suspension along a path perpendicular to the expected flow of contaminated groundwater. (As illustrated in FIG. 4).

Figure 5:
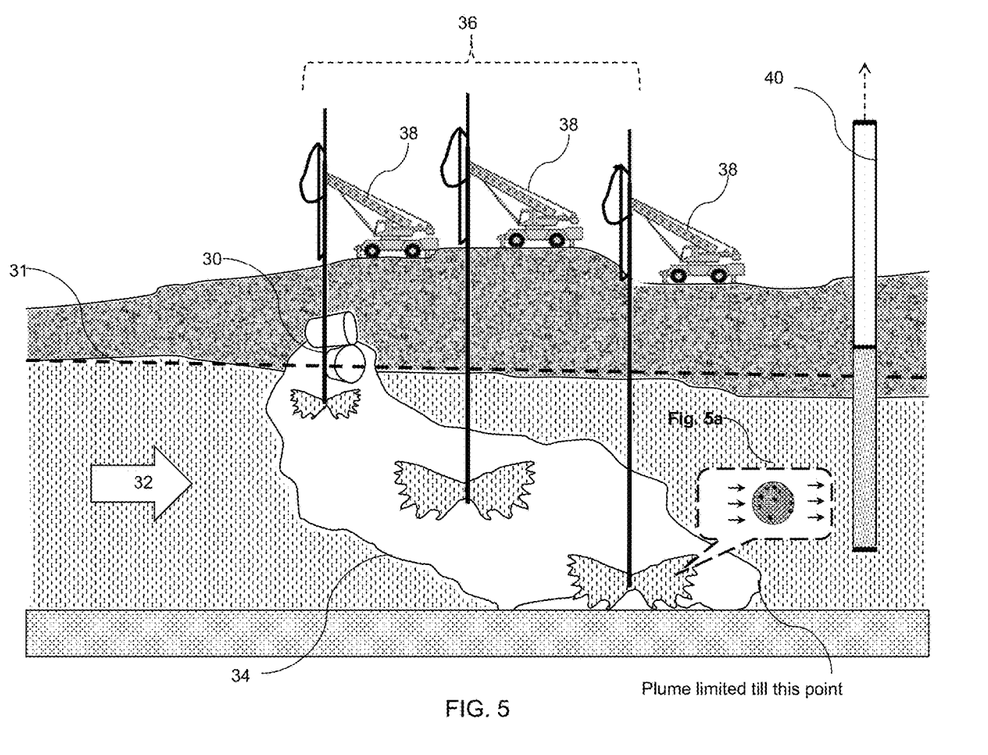
FIG. 5 is a schematic representation of a method for groundwater treatment according to the present ZVI formulation when introduced into the groundwater via an injection well, thereby illustrating another example application of ZVI formulation during ground water remediation, in accordance with an embodiment of the present disclosure.

The forthcoming description of FIGS. 4 to 6 relates to example implementations of ISCR comprising the use of ZVI suspension in the permeable reactive barriers (PRB); direct injection and direct mixing of the ZVI suspension into aquifer material for soil and groundwater remediation; and use of ZVI suspension in fixed bed reactors or filters for treatment of contaminated water.

FIG. 4 is a schematic representation of a method for treating groundwater using a permeable reactive barrier (PRB) and thereby representing example application for the present ZVI formulation during groundwater remediation. As shown in FIG. 4, the ZVI suspension can be used in permeable reactive barriers (PRBs) for groundwater treatment. The following Table 1 enumerates various components present therein alongside the reference numerals.

TABLE 1

| Reference numeral | Components |
| --- | --- |
| 18 | Permeable reactive barrier |
| 15, 16 | Permeability funnel structures |
| 20 | A plume of water |
| 21 | Arrow defining direction of water containing plume |
| 22 | Arrow defining direction of flow of water freed of contaminant within the aquifer |
| 24 | Arrow defining direction of flow of water plume or flow cleaned of contaminants |

Referring to FIG. 4 the permeable reactive barrier (18) of the ZVI suspension according to the present subject matter is placed downgradient of the contaminated zone. As the contaminated plume travels through the barrier in the direction of arrows (21), it will react with the ZVI Suspension and contaminants will be removed. Low permeability funnel structures (15, 16) may be emplaced to direct the plume of contaminated water (20) toward the ZVI suspension PRB (18). After passing through the permeable barrier (18), the freed-of-contaminant water continues to naturally flow as shown in arrows (22). The aquifer downgradient of the PRB (24) is thus cleaned of contaminants. FIG. 4a is an enlarged schematic representation of contaminated water contacting a ZVI particle of the ZVI suspension according to the present subject matter used in the PRB (18).

FIG. 5 is a schematic representation of a method for groundwater-treatment according to the present ZVI formulation when introduced into the groundwater via an injection well, thereby illustrating another example application of ZVI formulation during ground water remediation, in accordance with an embodiment of the present disclosure. The following Table 2 enumerates various components present therein alongside the reference numerals.

TABLE 2

| Reference numeral | Components |
| --- | --- |
| 36 | An injection well |
| 40 | Another injection well |
| 31 | Water Table |
| 32 | Arrow defining direction of water below water table |
| 30 | Contaminants |
| 34 | Plume of water |
| 38 | Injection Device |

As shown in FIG. 5, an injection-well (36) is provided upstream of a well 40 potentially used to retrieve groundwater for human use. The injection well (36) is drilled or dug so it intercepts the groundwater containing contaminants. Groundwater flows in the direction represented by arrow (32). The aquifer becomes contaminated as a contaminant source (30) typically originates on the surface and flows downward through soils until it reaches the water table (31). Contaminants (30) enter aquifer and move both downwards as DNAPLs and in the direction of groundwater flow as dissolved phase contamination to form a contaminated groundwater plume (34). The injection well (36) has been used to distribute ZVI suspension in the aquifer using an injection device (38), to a depth necessary to intercept and treat the contaminated water plume (34). The contaminated plume will be treated by the ZVI suspension and thereafter, precluding these contaminants from flowing with groundwater and arriving to the production well (40). FIG. 5a is an enlarged schematic representation of a ZVI particle of the ZVI suspension that has been injected into the ground through the well (36).

In an implementation of the process depicted in FIG. 5, as a part of the injection at-least one injection-point is advanced into said aquifer. The injection may be performed by a technique selected from one or more of at least one push-rod, at said at least one injection-point, an injection through well, a French drain type system, deep tilling, an hydraulic-injection, a multi-phase inert gas injection, an aerosol injection, a water injection, at least one pump, at least one blower, at least one compressor, tank, at least one tank of compressed gas, at least one compressed gas tank after a blower or compressor, a direct push rig, at least one hand-held injection rod, and a combination of one or more aforesaid techniques. Further, in an example, the introduction of ZVI formulation is performed at a pressure between approximately 10 psi and approximately 1,000 psi.

FIG. 6 (a to c) is a schematic-representation of a method for soil-treatment according to the present ZVI formulation when introduced below the earth's surface, thereby illustrating another example application of ZVI-formulation during in-situ soil remediation, in accordance with an embodiment of the present-disclosure. More specifically, the present FIG. 6 is a conceptual-model depicting ZVI-Clay soil-mixing as an in situ remediation technology for remediation of chlorinated dense non-aqueous phase liquids (DNAPLs).

FIG. 6a illustrates a heterogeneous subsurface before soil-mixing and thereby depicts a footprint of contaminated soils. FIG. 6b illustrates the process of soil-mixing using augers or special tools to mechanically-mix the soil with ZVI. The process simultaneously breaks up the soil without removing it, injects the ZVI at low pressure and thoroughly mixes the ZVI with the soil. Single or multiple mixing tools (auger, blades, rotary head) are used to directly inject ZVI into the mixing zones.

In an example, the present mechanism combines abiotic-degradation (via zero-valent iron, ZVI, addition) and immobilization (via soil-mixing and clay-addition). The ZVI-clay soil-mixing technology provides a delivery-mechanism that mechanically reduces subsurface heterogeneities. FIG. 6c illustrates a homogenized low-permeable subsurface after soil-mixing with bypassing groundwater, thereby depicting treated soil-columns. The ZVI-clay soil-mixing technology at least proves efficient for source mass depletion in the presence of DNAPL The ZVI suspension has been proven to effectively degrade halogenated solvents. For example, the mechanism and reaction rates of which iron reduces chlorinated aliphatics has been studied extensively due to iron's low-cost and low toxicity. The half reaction of)(Fe$^0$) to (Fe$^{+2}$) (Equation 1) has a reduction-potential of −0.440V. The estimated standard reduction potentials of alkyl halides at a pH of 7, as in Equation 2, ranges from +0.5 to +1.5V. Therefore, the net reaction (Equation 3) is thermodynamically favorable and is referred as anaerobic dechlorination. Equation 4 is referred as hydrolysis. The reductive dechlorination activity of ZVI is governed by the iron surface components and properties.

$$Fe^0 \rightarrow Fe^{2+} + 2e^- \qquad (1)$$

$$R\text{---}Cl + 2e^- + H^+ \rightarrow R\text{---}H + Cl^- \qquad (2)$$

$$Fe^0 + R\text{---}Cl + H^+ \rightarrow Fe^{2+} + R\text{---}H + Cl^- \qquad (3)$$

$$Fe^0 + 2H^+ \rightarrow Fe^{2+} + H_2 \qquad (4)$$

Notably, anaerobic dechlorination (Equation 3) and hydrolysis (Equation 4) are usually accompanied with pH increase and ferrous ions accumulation. Hydrogen-peroxide formed as a result of reduction of oxygen reacts with accumulated ferrous-ions (i.e. Fe$^{+2}$) to form Fe$^{+3}$ and hydroxyl radicals that are highly reactive oxidants to degrade aqueous phase TCE and/or oxidize TCE in the presence of the soil.

In an example, ZVI can react directly with sulfate via abiotic reaction (Equation 5). More significantly, ZVI reacts with water to produce H$_2$ and ferrous iron (Equation 6), after which sulfate is reduced by H$_2$ to sulfide via microbially-mediated reactions and forms iron sulfide precipitates (Equation 7)

$$Fe^0(S) + ¼SO_4^{2-} + 2H^+ \rightarrow ¼FeS(S) + ¾Fe^{2+} + 10H_2O \qquad (5)$$

$$Fe^0(S) + 2H_2O \rightarrow Fe^{2+} + H_2 + 2OH^- \qquad (6)$$

$$2Fe^{2+} + SO_4^{2-} + 4H_2 \rightarrow FeS(S) + 4H_2O \qquad (7)$$

Further, as it is known, in situ biogeochemical transformation refers to processes in which contaminants are degraded by abiotic-reactions with minerals formed that are either naturally occurring or are biogenically produced in the subsurface. Natural aquifer systems are complex ecosystems with a plethora of microbial-communities. Such microbial-communities are subject to a wide variety of changes as the environment of the aquifer is altered. The present ZVI formulation may be used to take advantage of the degradation capabilities of these microbial communities for a synergistic-degradation effect of target contaminants present in the aquifer.

A variety of different-substrates (e.g. electron donors such as vegetable oil) have been used to stimulate anaerobic-bioremediation. In practice, the added organic substrates are first fermented to hydrogen (H$_2$) and low-molecular weight fatty acids. These short-chain molecules, such as acetate, lactate, propionate, and butyrate, in turn provide carbon and energy for anaerobic bioremediation. In an example, the substrates may be categorized into four types: soluble substrates, viscous or low viscosity substrates, solid substrates, and miscellaneous experimental substrates. All of these substrates are biodegraded and ultimately yield hydrogen.

The present ZVI suspension formulation is such that the iron particles will suffer limited corrosion and limited exposure to water and oxygen during packaging, transport and storage. Corrosion on ZVI prior to its intended use decreases its cleaning performance. However, the present suspension offers logistical, economic and performance advantages, as the formulation protects the ZVI particles from corrosion until it is applied and used for remediation.

Further, the present ZVI suspension is a stable suspension and free from the constraints of ZVI particle agglomeration, sedimentation and deposition as otherwise suffered by conventional ZVI compositions. Such an improvement at-least facilitates an ease of logistics that accomplishes a dual purpose of single stage treatment in field operations and safe transportation for ZVI particles. Mixing amendments from different sources to prepare fluid systems in the field for remedial processes drastically increases logistical issues and complexity for any field projects and is much-less favourable for environmental clean-up operations. In contrast, the present ZVI suspension formulation provides significant improvements and synergism from the benefits of soybean oil (as a long lasting electron donor for biological treatment of contaminants) and propylene glycol (a quick release electron donor for biological treatment of contaminants).

In summary, the present ZVI suspension scores over the conventional ZVI uses at least based on presence of long lasting electron donors, quick release electron donors, corrosion-free environment during packaging, ease of logistics (single stage and easy to handle final product).

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for-purposes of example rather than limitation, and does not preclude inclusion of such modifications, variations, and/or additions to the present subject matter as would be readily apparent to one of ordinary skill in the art.

To the extent that method or apparatus embodiments herein are described as having certain numbers of elements, it should be understood that fewer than all of the elements may be necessary to define a complete claim. In addition, sequences of operations or functions described in various embodiments do not require or imply a requirement for such sequences in practicing any of the appended claims. Operations or functions may be performed in any sequence to effectuate the goals of the disclosed embodiments.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the forthcoming claims.

The invention claimed is:

1. A method for treating contaminated soil and water, the method comprising:
   preparing a zero-valent metal suspension in a non-aqueous phase, wherein the zero-valent metal suspension consists of a liquid membrane formed of a thickening agent, a surfactant and a vegetable oil encapsulating zero-valent metal particles; and
   introducing the zero-valent metal suspension in the non-aqueous phase into the contaminated soil and water by delivering in-situ through-contamination pools, directly mixing with the contaminated soil and water, or creating a permeable reactive barrier in the contaminated soil and water.

2. The method as claimed in claim 1, wherein preparing the zero-valent metal suspension in the non-aqueous phase consists of:
   mixing the thickening agent with the vegetable oil to prepare a non-aqueous solution;
   dissolving the surfactant into the non-aqueous solution; and
   mixing the zero-valent metal particles into the non-aqueous solution to obtain the zero-valent metal suspension in the non-aqueous phase.

3. The method as claimed in claim 2, wherein the zero-valent metal particles are microscale acid-washed iron-based powders having a diameter in a range of 1-45 microns, and wherein the zero-valent metal suspension is zero-valent iron (ZVI) suspension.

4. The method as claimed in claim 3, wherein the microscale acid-washed iron-based powder has an Fe-content of at least 90% by weight.

5. The method as claimed in claim 2, wherein the thickening agent is propylene glycol.

6. The method as claimed in claim 2, wherein the vegetable oil is a C4-C22 oil selected from the group consisting of soybean oil, corn oil, coconut oil, canola oil, peanut oil, sunflower oil, olive oil, garlic oil, crambe oil, and mixtures thereof.

7. The method as claimed in claim 6, wherein the vegetable oil is soybean oil.

8. The method as claimed in claim 2, wherein the surfactant comprises dioctyl sodium sulfosuccinate.

9. The method as claimed in claim 2, wherein mixing the thickening agent with the vegetable oil comprises mixing 21-41 wt. % of the thickening agent with 33-63 wt. % of the vegetable oil.

10. The method as claimed in claim 2, wherein dissolving the surfactant into the non-aqueous solution comprises dissolving about 0.05-1 wt. % of the surfactant.

11. The method as claimed in claim 2, wherein mixing zero-valent metal particles into the non-aqueous solution to obtain the zero-valent metal suspension in the non-aqueous phase comprises mixing 0.05-45 wt. % of zero-valent metal particles into the non-aqueous solution.

12. The method as claimed in claim 1, wherein contaminated soil and water are treated in-situ, without pumping out the contaminated soil and water.

13. The method as claimed in claim 1, wherein the zero-valent metal suspension in the non-aqueous phase is injected into the contamination pools by an advancing step comprising advancing at least one injection point into an aquifer.

14. The method as claimed in claim 13, wherein the advancing step is performed by a technique selected from the group consisting of at least one push rod, one injection point, an injection through a well, a French drain type system, deep tilling, an hydraulic injection, a multi-phase inert gas injection, an aerosol injection, a water injection, at least one pump, at least one blower, at least one compressor, tank, at least one tank of compressed gas, at least one compressed gas tank after a blower or a compressor, a direct push rig, at least one hand-held injection rod, and combinations thereof.

15. The method as claimed in claim 14, wherein the advancing step is performed by an injection through a well.

16. The method as claimed in claim 14, wherein the advancing step is performed at a pressure in a range of 10-1000 psi.

17. The method as claimed in claim 1, wherein the permeable reactive barrier is created by filling a trench with the ZVI suspension or by injecting the ZVI suspension along a path perpendicular to expected flow of the contaminated water.

* * * * *